US008903278B2

(12) United States Patent
Murakami et al.

(10) Patent No.: US 8,903,278 B2
(45) Date of Patent: Dec. 2, 2014

(54) DRIVE UNIT, AND IMAGE FORMING APPARATUS AND PROCESS CARTRIDGE INCORPORATING SAME

(71) Applicants: Hiroaki Murakami, Kanagawa (JP); Toshiyuki Uchida, Kanagawa (JP); Kazuhiro Kobayashi, Kanagawa (JP); Akihiko Tosaka, Kanagawa (JP)

(72) Inventors: Hiroaki Murakami, Kanagawa (JP); Toshiyuki Uchida, Kanagawa (JP); Kazuhiro Kobayashi, Kanagawa (JP); Akihiko Tosaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 167 days.

(21) Appl. No.: 13/654,881

(22) Filed: Oct. 18, 2012

(65) Prior Publication Data

US 2013/0118303 A1 May 16, 2013

(30) Foreign Application Priority Data

Nov. 15, 2011 (JP) ................................ 2011-249509
Jun. 15, 2012 (JP) ................................ 2012-136064

(51) Int. Cl.
*G03G 15/00* (2006.01)
*F16H 37/06* (2006.01)

(52) U.S. Cl.
USPC ........................................ 399/167; 74/665 G

(58) Field of Classification Search
USPC ........................................ 399/167; 74/655 G
See application file for complete search history.

(56) References Cited

U.S. PATENT DOCUMENTS

| | | | | | |
|---|---|---|---|---|---|
| 5,294,957 | A * | 3/1994 | Ahn | | 399/111 |
| 5,689,764 | A * | 11/1997 | Fukuchi et al. | | 399/75 |
| 5,905,927 | A * | 5/1999 | Inoue et al. | | 399/167 |
| 7,526,231 | B2 * | 4/2009 | Funamoto | | 399/167 |
| 2002/0003973 | A1 * | 1/2002 | Saito | | 399/167 |
| 2003/0113133 | A1 * | 6/2003 | Ryuzaki et al. | | 399/167 |
| 2005/0185980 | A1 * | 8/2005 | Okamoto | | 399/103 |
| 2006/0051134 | A1 * | 3/2006 | Ahn et al. | | 399/222 |
| 2006/0263114 | A1 * | 11/2006 | Ogawa | | 399/167 |
| 2007/0122165 | A1 * | 5/2007 | Igarashi et al. | | 399/12 |
| 2007/0196130 | A1 * | 8/2007 | Okabe et al. | | 399/167 |
| 2007/0196132 | A1 * | 8/2007 | Kobayashi et al. | | 399/167 |
| 2007/0212109 | A1 * | 9/2007 | Ebara et al. | | 399/167 |
| 2007/0253736 | A1 * | 11/2007 | Ehara et al. | | 399/167 |

(Continued)

FOREIGN PATENT DOCUMENTS

| | | |
|---|---|---|
| JP | 2004-102020 | 4/2004 |
| JP | 2004-109616 | 4/2004 |

(Continued)

OTHER PUBLICATIONS

Machine translation of JP 2010139846 A.*

*Primary Examiner* — David Bolduc
(74) *Attorney, Agent, or Firm* — Oblon, Spivak, McClelland, Maier & Neustadt, L.L.P.

(57) ABSTRACT

A drive unit for rotating a first rotary member and a second rotary member disposed around the first rotary member includes a drive source, an output gear driven by the drive source, a first gear greater in diameter than the output gear and configured to engage the output gear, a first joint member projecting from the first gear coaxially and coupled to the first rotary member, a second gear smaller in diameter than the first gear and connected between the first gear and the first joint member, a driven gear smaller in diameter than the first gear and disposed within an area of the first gear in a radial direction thereof to engage the second gear to be driven thereby, and a second joint member projecting from the driven gear coaxially and connected to the second rotary member.

3 Claims, 5 Drawing Sheets

(56) References Cited

U.S. PATENT DOCUMENTS

| | | | | |
|---|---|---|---|---|
| 2008/0213000 | A1* | 9/2008 | Funamoto et al. | 399/167 |
| 2008/0240784 | A1* | 10/2008 | Kim | 399/167 |
| 2009/0074506 | A1* | 3/2009 | Sugiyama et al. | 403/298 |
| 2010/0290810 | A1* | 11/2010 | Ito | 399/167 |
| 2011/0017004 | A1* | 1/2011 | Schaefer et al. | 74/421 R |
| 2011/0158711 | A1* | 6/2011 | Fukushima | 399/297 |

FOREIGN PATENT DOCUMENTS

| | | |
|---|---|---|
| JP | 2008-262096 | 10/2008 |
| JP | 2010-139846 | 6/2010 |
| JP | 2011145439 A * | 7/2011 |

* cited by examiner

DRIVE UNIT, AND IMAGE FORMING APPARATUS AND PROCESS CARTRIDGE INCORPORATING SAME

CROSS-REFERENCE TO RELATED APPLICATIONS

This patent application is based on and claims priority pursuant to 35 U.S.C. §119 to Japanese Patent Application Nos. 2011-249509 filed on Nov. 15, 2011 and 2012-136064 filed on Jun. 15, 2012 in the Japan Patent Office, the entire disclosure of each of which is hereby incorporated by reference herein.

FIELD OF THE INVENTION

The present invention generally relates to a drive unit for an image forming apparatus, such as a copier, a printer, a facsimile machine, or a multifunction machine including at least two of these functions; and an electrophotographic image forming apparatus and a process cartridge that incorporates a drive unit.

BACKGROUND OF THE INVENTION

Electrophotographic image forming apparatuses generally include a photoreceptor drum serving as an image bearer and rotary members that rotate around the photoreceptor drum, namely, a cleaning roller, a charging roller, and the like. The image bearer and such rotary members are rotated by a drive force transmitted from a drive source such as a motor.

For example, a structure proposed in JP-2010-139846-A includes a large-diameter gear to drive the image bearer, a motor to drive the large-diameter gear, and a drive gear to drive a rotary member of a development device, and the drive gear engages an output gear (a prime gear) of the motor, thereby rotating the rotary member.

In this structure, a drive force output from the output gear is transmitted to the image bearer and the rotary member through separate transmission routes. Accordingly, drive connections to transmit the drive force to the rotary members can increase in number, occupying a larger space inside the apparatus.

BRIEF SUMMARY OF THE INVENTION

In view of the foregoing, one embodiment of the present invention provides a drive unit for rotating a first rotary member and a second rotary member disposed around the first rotary member. The drive unit includes a drive source, an output gear driven by the drive source, a first gear to engage the output gear, a first joint member projecting from a rotation center of the first gear coaxially with the first gear and coupled to a rotation center of the first rotary member, a second gear disposed between the first gear and the first joint member and connected to the first gear and the first joint member coaxially therewith, a driven gear to engage the second gear to be driven thereby, and a second joint member projecting from a rotation center of the driven gear coaxially in a direction in which the first joint member projects and connected to a rotation center of the second rotary member. The first gear is greater in diameter than the output gear, and the second gear is smaller in diameter than the first gear. The driven gear is smaller in diameter than the first gear and disposed within an area in a radial direction of the first gear.

Another embodiment provides an image forming apparatus that includes an image bearer, a rotary member disposed around the image bearer, and the above-described drive unit to drive the image bearer and the rotary member.

In another embodiment, the image bearer and the rotary member driven by the drive unit are housed in a common unit casing of a process cartridge.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
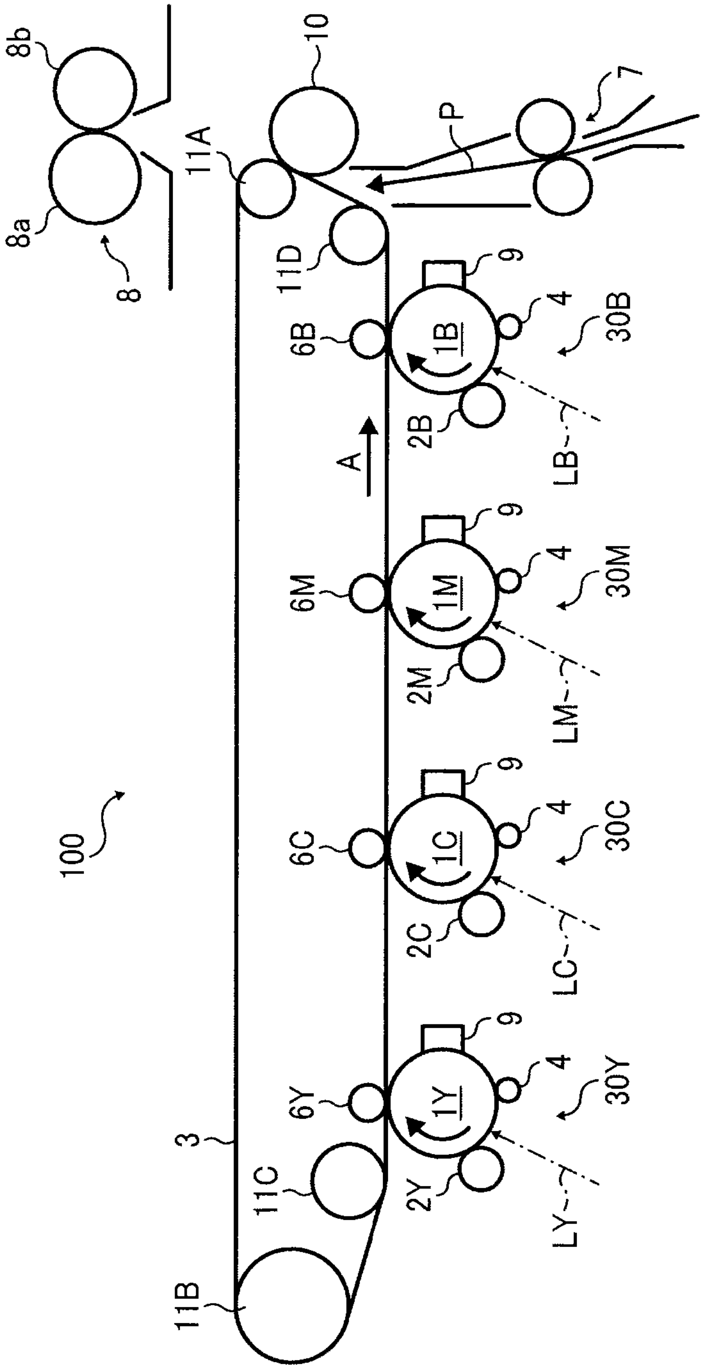
FIG. 1 is a schematic view of an image forming apparatus according to an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, a multicolor image forming apparatus according to an embodiment of the present invention is described.

It is to be noted that the suffixes Y, M, C, and B attached to each reference numeral indicate only that components indicated thereby are used for forming yellow, magenta, cyan, and black images, respectively, and hereinafter may be omitted when color discrimination is not necessary.

Figure 2:
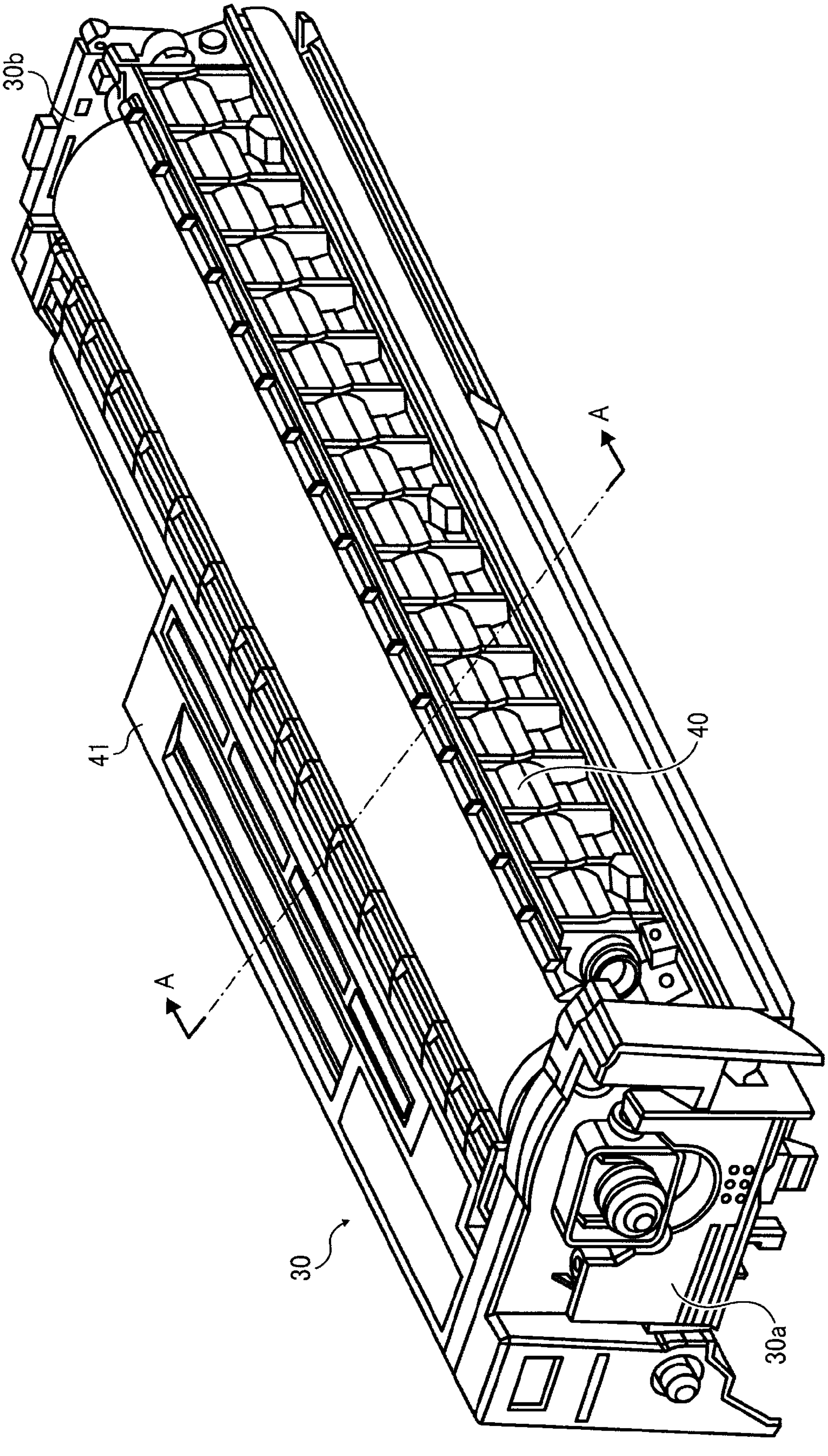
FIG. 2 is a perspective view of a process cartridge incorporated in the image forming apparatus shown in FIG. 1.

FIG. 1 is a schematic view of an image forming apparatus 100 according to an embodiment of the present invention. FIG. 2 is a perspective view of a process cartridge 30 removably mounted to a body of the image forming apparatus 100 shown in FIG. 1.

The image forming apparatus 100 according to the present embodiment is a so-called tandem image forming apparatus and includes drum-shaped photoreceptors 1Y, 1C, 1M, and 1B serving as image bearers on which toner images are formed, arranged in parallel to each other in the direction indicated by arrow A shown in FIG. 1, in which an endless intermediate transfer belt 3 travels.

The intermediate transfer belt 3 is stretched around support rollers 11A, 11B, 11C, and 11D. As one of the support rollers 11A through 11D rotates, the intermediate transfer belt 1 rotates in the direction indicated by arrow A. The toner images formed on the photoreceptors 1Y, 1C, 1M, and 1B are transferred therefrom and superimposed one on another on the intermediate transfer belt 3, thus forming a multicolor image.

Around the photoreceptor 1, a charging roller 4 to charge a surface of the photoreceptor 1 uniformly, a development device 2 to develop an electrostatic latent image formed on the photoreceptor 1 with toner into a toner image, and a cleaning unit 9 are provided. The cleaning unit 9 removes toner remaining (hereinafter "residual toner") on the photoreceptor 1 after a primary-transfer roller 6 transfers the toner image therefrom.

The components provided around the photoreceptor 1, namely, the charging roller 4, the development device 2, and the cleaning unit 9 can be housed in a common unit casing together with the photoreceptor 1, thus forming a process cartridge 30 shown in FIG. 2 for forming yellow, cyan, magenta, or black toner images. Thus, the photoreceptor 1, the charging roller 4, the development device 2, and the cleaning unit 9 can be installed and removed together at a time from the image forming apparatus 100 easily and securely with the relative positions among them maintained with a high degree of accuracy. It is not necessary that all of the charging roller 4, the development device 2, and the cleaning unit 9 are united with the photoreceptor 1 into the process cartridge 30, but at least one of them may be united to the photoreceptor 1.

In FIG. 1, the image forming apparatus 100 further includes a pair of registration rollers 7, a fixing device 8 including a heating roller 8*a* and a pressure roller 8*b*, and a secondary-transfer roller 10. It is to be noted that, in FIG. 1, reference characters LY, LC, LM, and LB represent laser beams (i.e., exposure light) to form electrostatic latent images on the respective photoreceptors 1, and reference character P represents a sheet serving as a recording medium.

Figure 3:
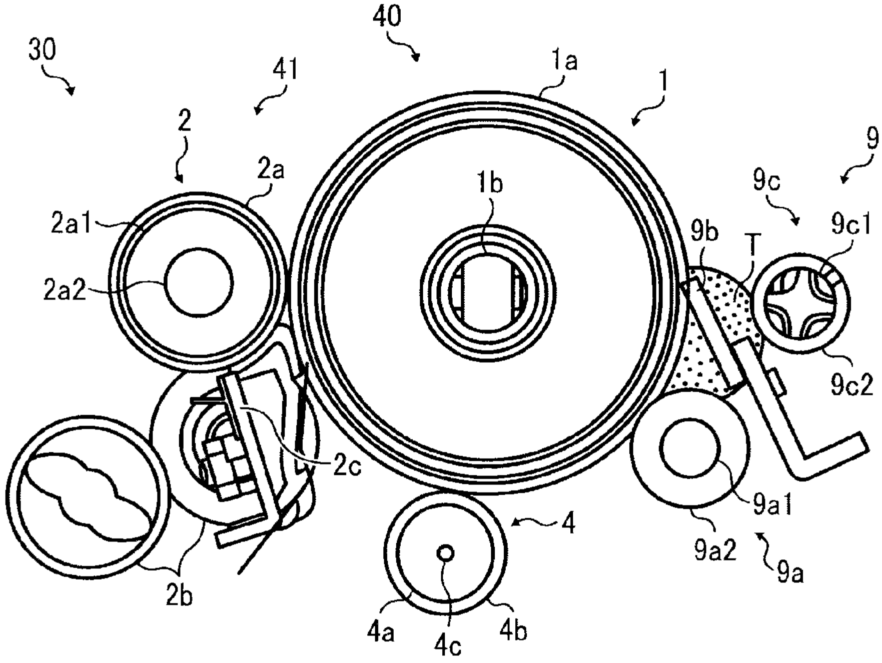
FIG. 3 is a cross-sectional view illustrating a main part of the process cartridge along line A-A shown in FIG. 2.

FIG. 3 is a cross-sectional view illustrating a main part of the process cartridge 30 along line A-A shown in FIG. 2.

In the configuration shown in FIGS. 2 and 3, the process cartridge 30 is constructed of a photoreceptor unit 40 and a development unit 41 (i.e., the development device 2). The photoreceptor unit 40 and the development unit 41 may be housed in a common unit casing as a single unit.

The photoreceptor unit 40 includes the photoreceptor 1, the charging roller 4, and the cleaning unit 9. A rotary shaft 1*b* of the photoreceptor 1 is supported by side plates 30*a* and 30*b* of the process cartridge 30 such that the photoreceptor 1 is rotatable. The charging roller 4 rotates while sliding on both axial end portions of the outer circumferential surface 1*a* of the photoreceptor 1. Spacers 4*b* are provided to axial end portions of the charging roller 4 to secure a predetermined distance between a charging portion 4*a* and the outer circumferential surface 1*a* of the photoreceptor 1. With this configuration, the charging portion 4*a* can be contactless from the photoreceptor 1 while charging the outer circumferential surface 1*a* of the photoreceptor 1 uniformly. The charging roller 4 is rotatable with a rotary shaft 4*c* thereof supported by the side plates 30*a* and 30*b* of the process cartridge 30. As the photoreceptor 1 rotates, the spacers 4*b* rotate, and thus the charging roller 4 rotates. It is to be noted that, alternatively, the charging roller 4 may be driven by a driving motor although the charging roller 4 in the present embodiment is not designed so.

The development device 2 contains two-component developer including negatively charged toner and magnetic carrier in the present embodiment. The development device 2 includes a development roller 2*a*, rotary conveyance screws 2*b* to agitate and supply developer to the development roller 2*a*, and a development doctor 2*c* to adjust the amount of developer on the development roller 2*a*. The development roller 2*a* includes a stationary magnet 2*a*2 and a development sleeve 2*a*1 that rotates around the magnet 2*a*2. As the development roller 2*a* rotates, developer particles are caused to stand on end on thereon, and toner is supplied to the outer circumferential surface 1*a* of the photoreceptor 1.

Developer is agitated and charged through triboelectric charging by the conveyance screws 2*b*, after which developer is supplied to the development roller 2*a*. After the development doctor 2*c* adjusts a layer thickness of toner carried on the development roller 2*a*, the developer is transported to a development position facing the photoreceptor 1, where toner is supplied to the electrostatic latent image formed on the photoreceptor 1. After toner therein is thus consumed, developer is returned inside the development unit 41 as the development roller 2*a* rotates.

As shown in FIG. 3, the cleaning unit 9, housed in the photoreceptor unit 40, includes a cleaning roller 9*a* to remove residual toner T from the outer circumferential surface 1*a* of the photoreceptor 1. The cleaning roller 9*a* includes a rotary shaft 9*a*1 and a toner remover 9*a*2, such as a fur brush or sponge, attached to the rotary shaft 9*a*1. For example, the cleaning roller 9*a* can remove residual toner T from the photoreceptor 1 by rotating in a direction counter to the direction in which the surface of the photoreceptor 1 moves.

The cleaning unit 9 further includes a cleaning blade 9*b* to scrape off residual toner T from the photoreceptor 1 by contacting slidingly the photoreceptor 1 and a toner discharge coil 9*c* through which toner removed by the cleaning blade 9*b* from the photoreceptor 1 (i.e., waste toner) is discharged outside. The toner discharge coil 9*c* includes a coil 9*c*2 winding around a rotary shaft 9*c*1. As the rotary shaft 9*c*1 rotates, waste toner is transported in the direction of winding of the coil 9*c*2. Thus, the residual toner T is removed by the cleaning blade 9*b* from the photoreceptor 1 and transported through the toner discharge coil 9*c* to a waste toner container.

Thus, in the present embodiment, the photoreceptor 1 can serve as a drum-shaped first rotary member, and the cleaning roller 9*a* and the toner discharge coil 9*c*, disposed around the photoreceptor 1 and housed in a common unit casing (i.e., the photoreceptor unit 40), can serve as second rotary members.

Referring to FIG. 1, image formation in the image forming apparatus 100 is described below.

Initially the photoreceptor 1 is rotated in the direction indicated by arrow shown in FIG. 1, and the charging roller 4 charges the outer circumferential surface 1*a* of the rotating photoreceptor 1 uniformly. Then, a writing unit directs the laser beam L to the charged outer circumferential surface 1*a* of the photoreceptor 1, thus forming an electrostatic latent image for the corresponding color. Then, the development device 2 supplies toner to the electrostatic latent image formed on the photoreceptor 1, developing it into a toner image.

Transfer bias voltages are applied to the primary-transfer rollers 6, thereby transferring the toner images from the respective photoreceptors 1 sequentially and superimposing them on the intermediate transfer belt 3. Thus, a multicolor toner image is formed. The multicolor toner image is then transferred from the intermediate transfer belt 3 by the secondary-transfer roller 10 onto a sheet P of recording media, forwarded by the pair of registration rollers 7, timed to coincide with the multicolor toner image. The fixing device 8 fixes the toner image on the sheet P with heat from the heating roller 8*a* and pressure from the pressure roller 8*b*, after which the sheet P is output from the image forming apparatus 100.

Meanwhile, the respective photoreceptors 1 from which the toner images are transferred are cleaned by the cleaning units 9 and charged by the charging rollers 4 as a preparation for subsequent image formation.

It is to be noted that, although the description above concerns tandem-type multicolor image forming apparatus, embodiments of the present invention are not limited thereto but can be, for example, monochrome image forming apparatuses including a single process cartridge for black. Additionally, although the description above concerns intermediate-transfer image formation using the intermediate transfer belt 3, embodiments of the present invention can be direct-transfer image forming apparatuses in which toner images formed on photoreceptors are transferred directly onto sheets of recording media transported by an endless conveyance belt.

Descriptions are given below of a drive route in the body and a drive transmission route to the photoreceptor 1, the development roller 2*a*, the conveyance screws 2*b*, the cleaning roller 9*a*, the toner discharge coil 9*c*, and the charging roller 4 housed in the process cartridge 30 according to the present embodiment.

Figure 4:
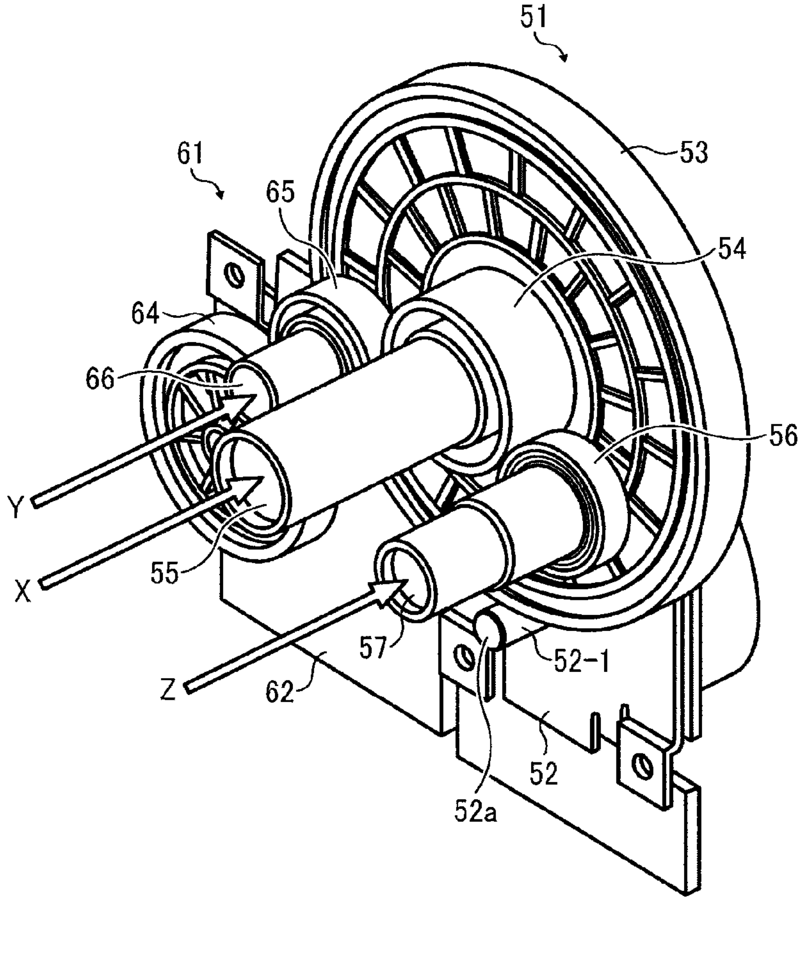
FIG. 4 is a schematic perspective view of drive units according to an embodiment as viewed from the side of a development gear.
Figure 5:
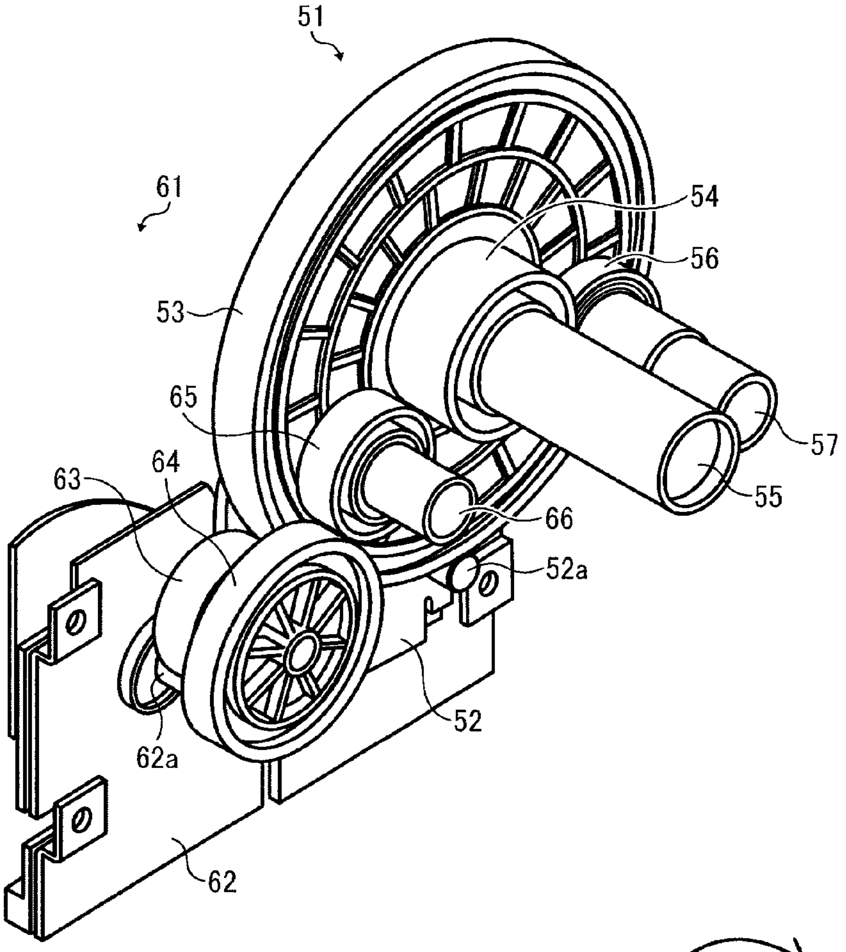
FIG. 5 is a perspective view of the drive unit as viewed from the side of a development clutch in FIG. 4.

Initially, the drive route in the body is described with reference to FIGS. 4 and 5. FIG. 4 is a schematic perspective view of drive units according to an embodiment as viewed from the side of a development gear. FIG. 5 is a perspective view of the drive units as viewed from the side of a development clutch in FIG. 4.

A photoreceptor drive unit 51 drives the first rotary member, namely, the photoreceptor 1, as well as the second rotary members, namely, the cleaning roller 9*a* and the toner discharge coil 9*c*, provided around the photoreceptor 1, housed in the photoreceptor unit 40. The photoreceptor drive unit 51 includes a photoreceptor motor 52 serving as a drive source, an output gear 52*a* (output gear) driven by the photoreceptor motor 52, a large-diameter gear 53 (first gear) larger in diameter than the output gear 52*a*, a small-diameter gear 54 (second gear) smaller in diameter than the large-diameter gear 53, and a first female joint 55 (first joint member). The large-diameter gear 53 is designed to mesh with the output gear 52*a* and decelerate outputs from the output gear 52*a* by being driven thereby. The small-diameter gear 54 is united to a first side of the large-diameter gear 53, specifically, united to a center of rotation (or axial center) of the large-diameter gear 53. The first female joint 55 projects to the photoreceptor 1 from a side of the small-diameter gear 54 coaxially with the small-diameter gear 54. Specifically, the first female joint 55 projects from a center of rotation (or axial center) of the small-diameter gear 54. The first female joint 55 is coupled to a rotation center of the photoreceptor 1. The first side of the large-diameter gear 53 faces the photoreceptor 1.

The photoreceptor drive unit 51 further includes a cleaning driven gear 56 (driven gear), smaller in diameter than the large-diameter gear 53, and a third female joint 57 (second joint) projecting toward the photoreceptor 1 from a first side of the cleaning driven gear 56 coaxially. In particular, the third female joint 57 projects from an axial center of the cleaning driven gear 56. The cleaning driven gear 56 meshes with the small-diameter gear 54 and is driven thereby. The third female joint 57 is coupled to a center of rotation of the cleaning roller 9*a*.

It is to be noted that the term "mesh" or "meshes" used in this specification means that projections and recesses of two gears engage each other, and the term "fits" means that the shape of one object fully conforms to the shape of the other object.

Gear tooth are cut in an output shaft 52-1 of the photoreceptor motor 52, thereby forming the output gear 52*a*. The drive force from the photoreceptor motor 52 is transmitted via the output gear 52*a* to the large-diameter gear 53. The drive force is then transmitted from the large-diameter gear 53 via the first female joint 55, which rotates together with the large-diameter gear 53, to a first male joint 31 (shown in FIG. 6) that rotates the photoreceptor 1. It is to be noted that the first female joint 55 can be a female joint member having an involute spline shape, for example. In the present embodiment, the drive force from the photoreceptor motor 52 is decelerated a single step and is transmitted directly to the photoreceptor 1. Alternatively, the drive force from the photoreceptor motor 52 may be decelerated two steps or further before transmitted to the photoreceptor 1.

Additionally, the large-diameter gear 53 can be a multistage gear having the small-diameter gear 54 at the axial center thereof. The drive force from the photoreceptor motor 52 is transmitted also to the cleaning driven gear 56 via the small-diameter gear 54 rotating integrally with the large-diameter gear 53. The drive force is then transmitted from the cleaning driven gear 56 via the third female joint 57 that rotates integrally with the cleaning driven gear 56 to a third male joint 36 (shown in FIGS. 6 and 7) that rotates together or integrally with the cleaning roller 9*a*. As the third male joint 36 rotates, further the toner discharge coil 9*c* is rotated. It is to be noted that the third female joint 57 can be a female joint member having an involute spline shape, for example.

It is to be noted that, in the present embodiment, a small-module gear having small teeth pitch is used as the large-diameter gear 53. This configuration can reduce the cycle of banding or color unevenness, making banding or color unevenness less noticeable in output images even if velocity fluctuations in teeth mesh cycle are reflected on the photoreceptor 1.

Next, a development drive unit 61 shown in FIGS. 4 and 5 to transmit drive force to the rotary members in the development unit 41 is described below.

The development roller 2*a* and the conveyance screws 2*b*, housed in the development unit 41, are driven by the development drive unit 61. The development drive unit 61 includes a development motor 62 serving as a drive source, an output gear 62*a* (development motor output gear) driven by the development motor 62, a development drive gear 63 larger in diameter than the output gear 62*a*, a development connection gear 64 provided to a first side of the development drive gear 63, coaxially with the development drive gear 63, a development driven gear 65 that meshes with the development connection gear 64 and is driven thereby, and a second female joint 66. The development drive gear 63 is designed to mesh with the output gear 62*a* and decelerate outputs from the output gear 62*a* by being driven thereby. The development connection gear 64 is larger in diameter than the development drive gear 63. The second female joint 66 projects coaxially from an axial center portion on a side of the development driven gear 65.

Gear tooth are cut in an output shaft of the development motor 62, and thus the output shafts serves as the output gear 62*a*. The drive force from the development motor 62 is transmitted via the output gear 62*a* to the development drive gear 63 and to the development connection gear 64, which rotates integrally with the development drive gear 63. Further, the drive force is transmitted from the development connection gear 64 to the development driven gear 65. As the development driven gear 65 rotates, the drive force is further transmitted to the second female joint 66 rotating together with the development driven gear 65. It is to be noted that the second female joint 66 can be a female joint member having an involute spline shape, for example.

The second female joint 66 transmits the drive force to a second male joint 32 (shown in FIGS. 6 and 7) of the development device 2. Rotation of the second male joint 32 drives the development roller 2*a* and the conveyance screws 2*b*.

Figure 6:
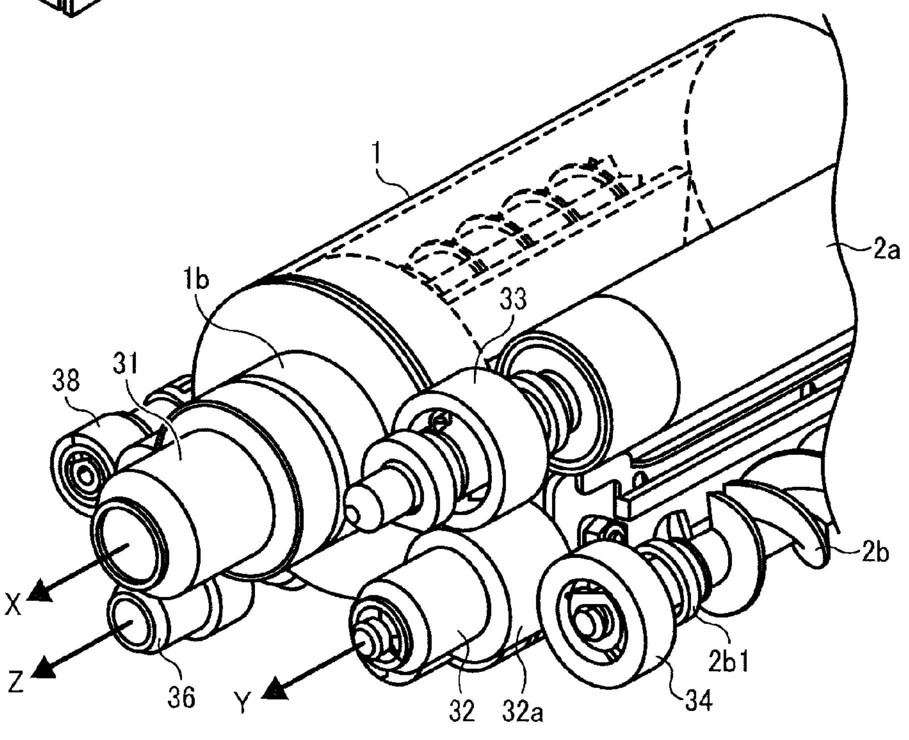
FIG. 6 is a partial perspective view of the process cartridge connected to the drive unit according to an embodiment as viewed from the side of a development roller.
Figure 7:
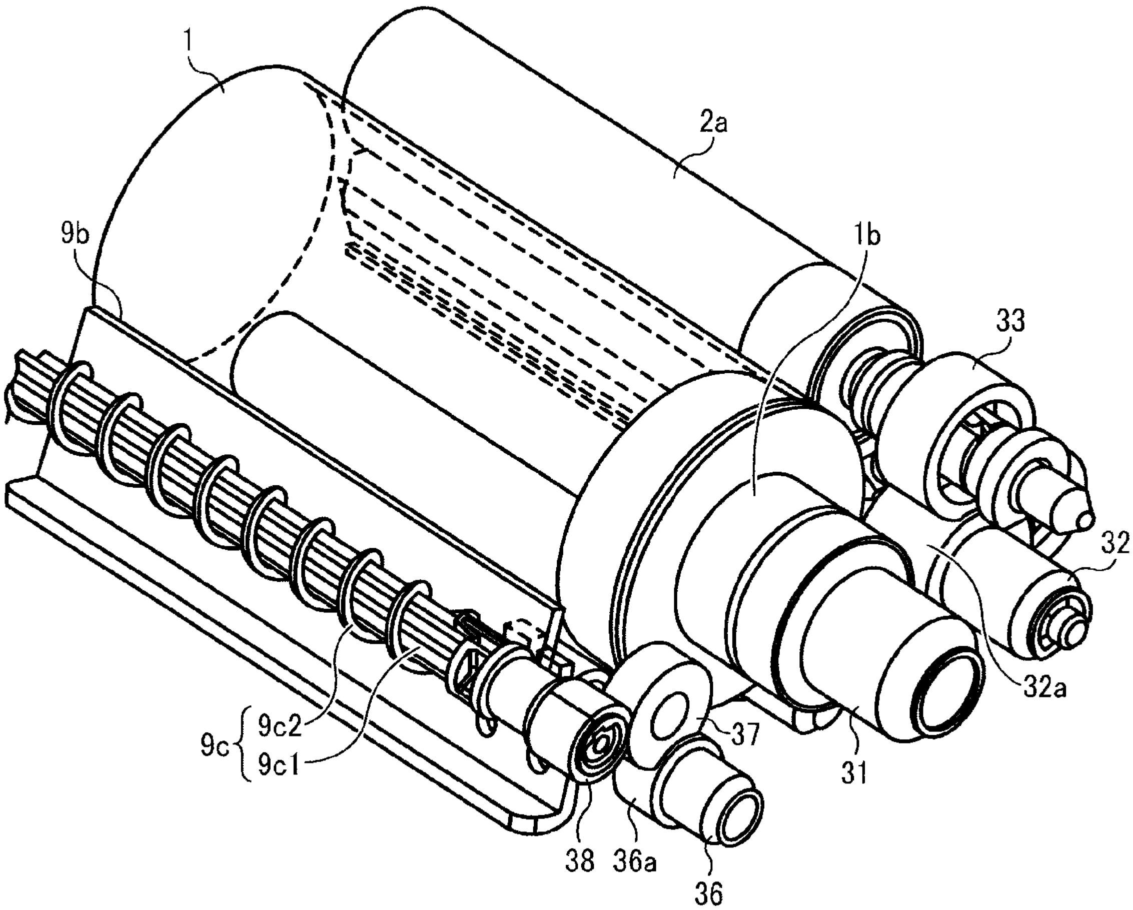
FIG. 7 is a partial perspective view of the drive unit shown in FIG. 6 as viewed from the side of a toner discharge coil.

Referring to FIGS. 6 and 7, descriptions are given below of a drive transmission route to the photoreceptor 1, the development roller 2*a*, the conveyance screws 2*b*, the cleaning roller 9*a*, and the toner discharge coil 9*c*, which are housed in the process cartridge 30 and driven by the above-described drive units. FIG. 6 is a partial perspective view of the process cartridge 30 connected to the drive unit according to an embodiment as viewed from the development roller 2*a*. FIG. 7 is a partial perspective view of the drive unit shown in FIG. 6 as viewed from the toner discharge coil 9*c*.

As shown in FIGS. 6 and 7, the development roller 2*a*, the conveyance screws 2*b*, the cleaning roller 9*a* (shown in FIG. 3), and the toner discharge coil 9*c* (rotary members) are provided around the photoreceptor 1 in the process cartridge 30. The rotary shafts of these rotary members are rotatably supported by the side plates 30*a* and 30*b* (shown in FIG. 2) of the process cartridge 30, retained in parallel to the rotary shaft 1*b* of the photoreceptor 1. The first male joint 31, having an involute spline shape, projects from the rotary shaft 1*b* of the photoreceptor 1 on the side of the side plate 30*b*. The first male joint 31 is connected to the rotary shaft 1*b* coaxially and rotates together with the photoreceptor 1.

Accordingly, as shown in FIGS. 4 and 6, when the first male joint 31 of the process cartridge 30 is inserted in the direction indicated by arrow X (hereinafter "direction X") into the first female joint 55 of the photoreceptor drive unit 51, the first male joint 31 can be connected to the first female joint 55 properly. Then, rotation force from the photoreceptor motor 52 can be transmitted to the photoreceptor 1 via the first male joint 31. With this rotation force, the photoreceptor 1 can rotate smoothly inside the process cartridge 30.

Similarly, referring to FIG. 6, the second male joint 32, having an involute spline shape, for rotating the development roller 2*a* and the conveyance screws 2*b*, projects on the side of the side plate 30*b* (shown in FIG. 2). The second male joint 32 is supported rotatably by the side plate 30*b* (shown in FIG. 2). A first rotation gear 32*a* is attached coaxially to the second male joint 32, and a second rotation gear 33 is attached coaxially to a rotary shaft of the development roller 2*a*. With the second rotation gear 33 meshing with the first rotation gear 32*a*, the development roller 2*a* can rotate as the second male joint 32 rotates.

Further, a third rotation gear 34 provided coaxially with the rotary shaft 2*b*1 of the conveyance screws 2*b* meshes with the first rotation gear 32*a*, and the conveyance screw 2*b* rotates as the second male joint 32 rotates. Coupling in this case is similar to the coupling of the first male joint 31 fitted in the first female joint 55 of the photoreceptor drive unit 51. Specifically, as shown in FIGS. 4 and 6, the second male joint 32 is inserted in the direction indicated by arrow Y (hereinafter "direction Y") into the second female joint 66 of the development drive unit 61. With the second male joint 32 fitted in the second female joint 66, rotation force from the development motor 62 can be transmitted to the first rotation gear 32*a*. Accordingly, the rotation force transmitted to the first rotation gear 32*a* can rotate the development roller 2*a* and the conveyance screws 2*b* smoothly inside the process cartridge 30.

Additionally, as shown in FIG. 7, the third male joint 36, having an involute spline shape, projects from one end of the cleaning roller 9*a* (shown in FIG. 3) on the side of the side plate 30*b* (shown in FIG. 2), coaxially with the rotary shaft 9*a*1 of the cleaning roller 9*a*. The third male joint 36 is supported rotatably by the side plate 30*b* (shown in FIG. 2). The cleaning roller 9*a* is designed to rotate as the third male joint 36 rotates.

A fourth rotation gear 36*a* is fixed coaxially with a rotation axis of the third male joint 36 and positioned between the third male joint 36 and the toner remover 9*a*2. The fourth rotation gear 36*a* meshes with a fifth rotation gear 37 serving as an intermediate gear, and rotation of the third male joint 36 is transmitted via the fourth rotation gear 36*a* to the fifth rotation gear 37. Further, the fifth rotation gear 37 meshes with a sixth rotation gear 38 provided coaxially with the rotary shaft 9*c*1 of the toner discharge coil 9*c*, and the toner discharge coil 9*c* rotates as the third male joint 36 rotates. Coupling in this case is similar to the coupling of the first male joint 31 fitted in the first female joint 55 of the photoreceptor drive unit 51. Specifically, as shown in FIGS. 4 and 6, the third male joint 36 is inserted in the direction indicated by arrow Z (hereinafter "direction Z") into the third female joint 57 of the photoreceptor drive unit 51. With the third male joint 36 fitted in the third female joint 57, rotation force from the photoreceptor motor 52 can be transmitted to the fourth rotation gear 36*a*. Accordingly, the rotation force transmitted to the fourth rotation gear 36*a* can rotate the cleaning roller 9*a* and the toner discharge coil 9*c* smoothly inside the process cartridge 30.

It is to be noted that, although the charging roller 4 is rotated by rotation of the photoreceptor 1 in the above-described configuration, alternatively, the charging roller 4 may be rotated by a drive force. In such a configuration, it is preferable that the drive force is given from not the photoreceptor 1 via, for example, a flange-shaped gear provided to an end of the photoreceptor 1 but an element outside the process cartridge 30.

Additionally, male and female shapes of the above-described involute spline shapes can be reversed.

In the image forming apparatus according to the present embodiment, the rotary members, such as the cleaning roller 9*a* and the toner discharge coil 9*c*, disposed around the photoreceptor 1 receive the driving force from the third female joint 57 projecting from the cleaning driven gear 56 that meshes with the small-diameter gear 54 united to the axial center of the large-diameter gear 53. This configuration can obviate the need for supply of drive force from a flange-shaped gear provided to one end of the photoreceptor 1. Supplying drive force from the flange-shaped gear requires a drive transmission route from a large-diameter gear to a mating gear, and to a brush gear meshing with a flange gear coaxial with the mating gear.

Instead, in the present embodiment, the drive force is transmitted from a large-diameter gear to a brush gear meshing with a small-diameter gear coaxial with the large-diameter gear, thus eliminating the flange gear and an element mating with the brush gear. In other words, since the number of times of gear meshing in the drive transmission route is reduced from twice to once, gear meshing frequency is less reflected on the photoreceptor 1. Therefore, the possibility of occurrence of banding can be reduced.

Additionally, this configuration occupies a smaller space because the cleaning driven gear 56 is shaped to fall inside the face (projected area) of the large-diameter gear 53.

Additionally, the cleaning roller 9*a* and the toner discharge coil 9*c* receive the drive force transmitted through a joint structure, which is effective as the drive force can be transmitted with influence of gear meshing vibration on the photoreceptor 1 reduced or eliminated. In particular, the joint structure having involute spline shapes, as in the above-described embodiment, are effective to prevent reflection of gear meshing vibration on the photoreceptor 1.

In particular, the joint structure having involute spline shapes, as in the above-described embodiment, are effective to prevent reflection of gear meshing vibration on the photoreceptor 1.

In the above-described embodiment, the driving force for driving the rotary members, namely, the cleaning roller 9*a* and the toner discharge coil 9*c*, housed in the photoreceptor unit 40 together with the photoreceptor 1, are transmitted from the photoreceptor motor 52 via the large-diameter gear 53 (first gear), the small-diameter gear 54 (second gear), the cleaning driven gear 56, and the third female joint 57 (second joint member). The large-diameter gear 53 and the small-diameter gear 54 are coaxial with each other, forming a multistage gear, and the cleaning driven gear 56 and the third female joint 57 are coaxial with each other similarly. The cleaning driven gear 56 (driven gear) engages the small-diameter gear 54 (second gear) that rotates coaxially with the large-diameter gear 53 (first gear) and thus receives drive force therefrom.

Accordingly, the train of driving elements from the large-diameter gear 53 to the third female joint 57 can be disposed within the area (projected area) in the radial direction of the large-diameter gear 53, thus reducing the space necessary to accommodate the train of driving elements for the rotary members. Additionally, the driving force for the rotary members can be transmitted through meshing of gears, without pulleys or belts. Thus, the number of components can be reduced.

If the cleaning roller 9*a* or the toner discharge coil 9*c*, or both, are given driving force from the development motor 62 via a train of driving elements thereof, it requires a number of connections and a larger space. The above-described configuration can eliminate such disadvantages.

Additionally, in the above-described embodiment, the cleaning roller 9*a* and the toner discharge coil 9*c* are given driving force from the driving source (photoreceptor motor 52) identical to that for the photoreceptor 1. Simultaneously, since the cleaning driven gear 56 and the third female joint 57, both to transmit driving force from outside the process cartridge 30 to the cleaning roller 9*a* and the toner discharge coil 9*c*, are positioned within the area (projected area) of the large-diameter gear 53 in the radial direction, the configuration can be simple, and can be disposed within a smaller space.

By contrast, if a gear disposed inside the projected area of the large-diameter gear 53 is driven by an additional motor separate from the photoreceptor motor 52 for driving the large-diameter gear 53, and the additional motor is disposed outside the projected area of the large-diameter gear 53, a part of the train of driving elements is positioned outside the projected area of the large-diameter gear 53.

As described above, in the above-described embodiment, at least one of the rotary members disposed around the image bearer is given driving force from the second joint member projecting from axial center (or center of rotation) of the driven gear. The driven gear engages the second gear that rotates coaxially with the first gear, and thus driving force from the first gear can be transmitted to the driven gear and further to the rotary member. Since the driven gear is shaped to occupy only an area inside the area of the first gear in the radial direction thereof, space necessary for drive connection for the rotary member can be reduced.

Numerous additional modifications and variations are possible in light of the above teachings. It is therefore to be understood that, within the scope of the appended claims, the disclosure of this patent specification may be practiced otherwise than as specifically described herein.

What is claimed is:

1. An image forming apparatus comprising:
- a drum-shaped image bearer;
- a rotary member disposed around the image bearer; and
- a drive unit to drive the image bearer and the rotary member, the drive unit comprising:
  - a drive source;
  - an output gear driven by the drive source;
  - a first gear to engage the output gear, the first gear greater in diameter than the output gear;
  - a first joint member projecting from a rotation center of the first gear coaxially with the first gear and coupled to a rotation center of the first rotary member;
  - a second gear disposed between the first gear and the first joint member and connected to the first gear and the first joint member coaxially therewith, the second gear smaller in diameter than the first gear;
  - a driven gear to engage the second gear to be driven thereby, the driven gear smaller in diameter than the first gear and disposed entirely within an area of the first gear in a radial direction thereof; and
  - a second joint member projecting coaxially from a rotation center of the driven gear in a direction in which the first joint member projects and connected to a rotation center of the rotary member.

2. A process cartridge removably mounted in the image forming apparatus according to claim 1, the process cartridge comprising:
- the image bearer; and
- the rotary member disposed around the image bearer and housed in a unit casing together with the image bearer.

3. The image forming apparatus according to claim 1, wherein the second joint member has an involute spline shape.

* * * * *